United States Patent [19]
Daniels et al.

[11] 4,247,665
[45] Jan. 27, 1981

[54] THERMOPLASTICS POLYMER COMPOSITIONS

[75] Inventors: Terry Daniels, Oldbury; Frederick J. Parker, Sutton Coldfield; Alan G. Eades, Sedgley, all of England

[73] Assignee: British Industrial Plastics Limited, Manchester, England

[21] Appl. No.: 41,065

[22] Filed: May 21, 1979

[30] Foreign Application Priority Data

May 25, 1978 [GB] United Kingdom ............... 22248/78

[51] Int. Cl.³ ...................... C08L 77/02; C08L 77/06
[52] U.S. Cl. ..................................... 525/421; 525/66; 525/179; 525/183
[58] Field of Search ................... 525/66, 183, 179, 421

[56] References Cited

U.S. PATENT DOCUMENTS

| 2,524,045 | 10/1950 | Flory | 525/183 |
|---|---|---|---|
| 3,672,975 | 6/1972 | Arons | 117/118 |
| 3,963,799 | 6/1976 | Starkweather | 525/183 |
| 3,972,961 | 8/1976 | Hammer | 525/183 |
| 3,985,703 | 10/1976 | Ferry | 525/66 |
| 4,000,216 | 12/1976 | Lang | 525/66 |
| 4,017,557 | 4/1977 | Hammer | 525/66 |
| 4,035,438 | 7/1977 | Nielinger | 525/183 |
| 4,086,296 | 4/1978 | Carty | 525/183 |
| 4,148,846 | 4/1979 | Owens | 525/66 |

FOREIGN PATENT DOCUMENTS

| 2755169 | 6/1978 | Fed. Rep. of Germany . |
| 1411274 | 8/1965 | France . |
| 1047069 | 11/1966 | United Kingdom . |
| 1052323 | 12/1966 | United Kingdom . |
| 1262802 | 2/1972 | United Kingdom . |

Primary Examiner—Paul Lieberman
Attorney, Agent, or Firm—Stevens, Davis, Miller & Mosher

[57] ABSTRACT

A thermoplastic polymer composition of an aliphatic polyamide and a modifier. The modifier is a copolymer of nylon 6 and an acrylic polymer, its inclusion in the composition enabling the properties of the aliphatic polyamide (e.g. nylon 6, nylon 66, nylon 11) to be modified without need of co-condensation with the modifier.

The modifier copolymer is 0.5 to 50 percent by weight of the composition. The proportion of acrylic polymer in the copolymer is not more than 25 percent by weight. The acrylic polymer comprises molecular chains derived from acrylonitrile or from a major proportion of an alkyl ester of acrylic or methacrylic acid and a minor proportion of a copolymerizable unsaturated carboxylic acid.

The preferred acrylic polymer is a multi-phase polymer comprising a first, elastomeric, phase and a second, rigid thermoplastic, phase.

The composition can be used for moulding articles.

12 Claims, No Drawings

THERMOPLASTICS POLYMER COMPOSITIONS

This invention relates to thermoplastic compositions. Thermoplastic aliphatic polyamides such as nylon 6, nylon 66, nylon 11 have, among their uses manufacture of moulded articles. Mouldings made from these polymers could be improved in various ways. Thus, the melt viscosity of some polymers e.g. nylon 6 and nylon 11 is low, which renders processing difficult and precludes blow moulding techniques being used.

Also water absorption of some polymers such as nylon 6 and nylon 66 is relatively high affecting the dimensional stability of mouldings made therefrom.

Furthermore it would be useful to improve the impact strength of thermoplastic nylons such as nylon 6, nylon 11 and nylon 66.

U.K. Pat. No. 1,368,628 discloses an acrylic modifier for nylons, to improve their impact strength etc. This modifier is used by being co-reacted with the nylon at elevated temperature e.g. in an extruder.

Our own co-pending UK Patent Application No. 51804/76 (Published in Germany as OLS No. 27 55 169) discloses co-condensing another acrylic polymer with nylons to improve the processability of the nylon.

In each case the acrylic modifier has to be co-reacted with each batch of nylon being used for moulding.

We have now found, however, a technique for modifying the properties of nylons which does not require the co-condensation to be carried out on all the nylon being used.

According to the present invention a thermoplastic polymer composition comprises a major proportion of a thermoplastic aliphatic polyamide and, as a modifier from 0.5 to 50 percent by weight of a copolymer of nylon 6 and an acrylic polymer in which the proportion of the acrylic polymer in the copolymer is not more than 25 percent and in which the acrylic polymer comprises molecular chains derived from acrylonitrile or from a major proportion of an alkyl ester of acrylic or methacrylic acid and a minor proportion of a copolymerizable unsaturated carboxylic acid.

The thermoplastic polymeric material is preferably nylon 6, nylon 66 or nylon 11.

The nylon 6 in said copolymer is preferably of a moulding grade.

The acrylic polymer may solely consist of a thermoplastic polymer. Preferably such a polymer is one in which a major proportion is derived from an alkyl ester of acrylic or methacrylic acid and a minor proportion of a copolymerizable unsaturated carboxylic acid.

The copolymerizable ethylenically unsaturated acid is preferably an $\alpha\beta$ unsaturated monocarboxylic acid such as acrylic acid, or methacrylic acid. It is preferably incorporated in the acrylic polymer in an amount in the range of 3% to 15% by weight of the acrylic polymer.

The alkyl ester of acrylic or methacrylic acid may be any of such esters used for acrylic polymers such as butyl methacrylate, ethyl methacrylate, methyl methacrylate, butyl acrylate, ethyl acrylate and preferably is a mixture of such esters. The particularly preferred esters are methyl methacrylate and butyl acrylate.

Preferably the acrylic polymer is a multi-phase polymer comprising a first, elastomeric, phase and a second rigid thermoplastic phase. Such a polymer may be prepared by sequential emulsion polymerization and may comprise (A) a first elastomeric phase having a glass transition temperature less than 25° and polymerized from monomers comprising a major amount of ($C_1$ to $C_5$-alkyl) acrylate, a poly unsaturated cross-linking monomer having a plurality of addition polymerizable unsaturated groups, each of which participates in the polymerization reaction at about the same rate as the other(s), and a graft-linking monomer having two or more addition polymerizable unsaturated reactive groups which participate in the polymerization reaction at substantially different rates and (B) a final rigid thermoplastics phase having a glass transition temperature above 50° and containing amine-reactive carboxylic acid groups and polymerized from monomers comprising a major amount of an alkyl methacrylate and a minor amount of a copolymerizable carboxylic acid. This polymer is described in more detail and claimed in UK Pat. No. 1,368,628 (Rohm and Haas Company).

The modifier used in the present invention is prepared by co-condensing the nylon 6 and the acrylic polymer so that some of the carboxylic acid groups of the acrylic polymer react with some of the amine end groups of the nylon 6 to form covalent carbonamide linkages.

This can be achieved by any processing operation which results in an intimate mixture of the two polymers being heated to a sufficient temperature. Examples of such operations are milling, and co-extrusion in a compounding extruder.

The thermoplastic composition incorporating the modifier may itself be prepared by compounding the thermoplastic polymer and the modifier in a suitable compounding extruder, but is preferably prepared simply by blending modifier and thermoplastic polymer in granular form and feeding the blend to a screw injection machine or extruder e.g. of the kind used for forming sections.

The invention is illustrated by means of the following examples.

EXAMPLE 1

A modifier polymer was prepared by blending in a compounding extruder nylon 6 polymer with 10% by weight based on total polymer of an acrylic polymer additive Paraloid KR725 (commercially available from Rohm & Haas), the latter being a multi-phase polymer of the kind mentioned above.

Various blends of the modifier polymer with a commercially available nylon 6 moulding polymer (MD3 commercially available from BIP Chemicals Ltd) were injection moulded to make test samples. The test samples were used to measure the various properties of the resulting moulded composition and the results are given below in Table I. The melt flow index (MFI) was also measured at 230° C., 12.5 kg load, on reground mouldings.

TABLE I

| % Modifier Polymer in Blend | MFI | Flexural Strength (MPa) | | Flexural Modulus (GPa) | | Impact Strength KJ/$M^2$ (Charpy, Notched) | |
|---|---|---|---|---|---|---|---|
| | | Dry | Cond** | Dry | Cond** | Dry | Cond** |
| 0 | 30.0 | 87 | 32 | 2.8 | 0.8 | 2.8 | 31 |
| 10 | 17.5 | 91 | 20 | 3.0 | 2.0 | 4.7 | * |
| 20 | 16.9 | 88 | 27 | 2.9 | 1.9 | 5.4 | * |
| 40 | 14.2 | 85 | 26 | 2.8 | 1.8 | 7.6 | * |
| 70 | 13.3 | 81 | 24.3 | 2.6 | 1.7 | 10.5 | * |

TABLE I-continued

| % Modifier Polymer in Blend | MFI | Flexural Strength (MPa) Dry | Flexural Strength (MPa) Cond** | Flexural Modulus (GPa) Dry | Flexural Modulus (GPa) Cond** | Impact Strength KJ/M² (Charpy, Notched) Dry | Impact Strength KJ/M² (Charpy, Notched) Cond** |
|---|---|---|---|---|---|---|---|
| 100 | 9.1 | 80 | 23.7 | 2.5 | 1.6 | 12.8 | * |

**Conditioned to 3% moisture
*All conditioned blends remained unbroken on testing for impact with the largest pendulum hammer available, their impact strengths were thus much higher than that of the unmodified nylon 6.

The results indicate that the mechanical properties of the blend change almost linearly with the composition of the blend with one exception the impact strength of the blend after conditioning is markedly increased by even the lowest loading of modifier, despite the fact that the value before conditioning increases in a linear relation.

Also, the melt flow index of the blend is decreased in non-linear fashion, even a small addition of the modifier (10%) having a substantial effect (i.e. the melt flow viscosity of the blend is markedly increased, over that of the unmodified nylon 6).

The reduced melt-flow index found in these blends is particularly advantageous. Unmodified nylon has a very low melt viscosity which renders it difficult to handle for any purposes, so that the higher melt viscosity leads to a generally improved processability in the compositions provided by this invention. This also leads to the possibility of blow moulding the composition, a process for which unmodified nylon is unsuitable.

One way of improving the processability of nylon is known to be to raise its molecular weight, but this raises its production time and its cost and even then a commercially blow-mouldable polymer is not produced.

EXAMPLE II

A series of materials were prepared following essentially the same procedure as in Example I.

For each material test samples were moulded and the following properties measures: Melt Flow Index, Flexural Modulus, Tensile Strength, Elongation at Break, Charpy Notched Impact Strength.

In each case, except for the Melt Flow Index, samples were tested both dry and after conditioning, and in some instances the take up of water during conditioning was measured.

Table IIA shows the compositions and Melt Flow Indexes (where measured) of materials Nos. 1 to 15. Of these, 1, 2 and 3 were controls showing for comparison the properties of the Nylon 6, Nylon 66 and nylon 11 used, and No. 4 was a control showing the properties of the nylon 6/ acrylic copolymer being used as a modifier.

Table IIB shows the other physical properties measured on samples of the materials 1 to 15.

Table IIIA shows the compositions and Melt Flow Indexes of materials Nos. 16 to 31. Of these, materials 16 to 21 were controls showing for comparative purposes the properties of potential modifier copolymers.

Table IIIB shows the other physical properties measured on samples of materials 16 to 31.

TABLE IIA

| | OVERALL COMPOSITION - A+B | | | | | |
|---|---|---|---|---|---|---|
| | A | B Reacted Together | B Reacted Together | | MELT FLOW INDEX (MFI) 12.5 kg at | MELT FLOW INDEX (MFI) 12.5 kg at |
| Material No. | Percentage Blended Nylon | % Nylon | % Paraloid KR725 | % Paraloid in B | 265° C. | 230° C. |
| 1 | Nylon 6 | — | — | — | — | 32 ± 2 |
| 2 | Nylon 66 | — | — | — | 23 ± 2 | — |
| 3 | Nylon 11 | — | — | — | — | 183 ± 14 |
| 4 | — | Nylon 6, 93 | 7 | 7 | 64 ± 2 | 21 ± 4 |
| 5 | Nylon 66,99.5 | Nylon 6 0.465 | 0.035 | 7 | 22 ± 2 | — |
| 6 | Nylon 95 | Nylon 4.65 | 0.35 | 7 | — | — |
| 7 | Nylon 90 | Nylon 9.3 | 0.7 | 7 | — | — |
| 8 | Nylon 80 | Nylon 18.6 | 1.4 | 7 | — | — |
| 9 | Nylon 70 | Nylon 27.9 | 2.1 | 7 | 24 ± 1 | — |
| 10 | Nylon 50 | Nylon 46.5 | 3.5 | 7 | 25 ± 4 | — |
| 11 | Nylon 20 | Nylon 74.4 | 5.6 | 7 | — | — |
| 12 | Nylon 10 | Nylon 83.7 | 6.3 | 7 | — | — |
| 13 | Nylon 5 | Nylon 88.35 | 6.65 | 7 | 51 ± 4 | — |
| 14 | Nylon 6, 70 | Nylon 27.9 | 2.1 | 7 | 270 ± 15 | 33 ± 11 |
| 15 | Nylon 11, 70 | Nylon 27.9 | 2.1 | 7 | 130 ± 30 | 61 ± 11 |

TABLE IIB

| Material No. | FLEXURAL STRENGTH MPa Dry | FLEXURAL STRENGTH MPa Cond* | TENSILE STRENGTH MPa Dry | TENSILE STRENGTH MPa Cond* | FLEXURAL MODULUS GPa Dry | FLEXURAL MODULUS GPa Cond* | ELONGATION % Dry | ELONGATION % Cond* | CHARPY NOTCHED IMPACT STRENGTH (KJ/m²) Dry | CHARPY NOTCHED IMPACT STRENGTH (KJ/m²) Cond* | %** Water Absorbtion |
|---|---|---|---|---|---|---|---|---|---|---|---|
| 1 | 87 | 25 | 76 | 35 | 2.8 | 0.8 | 4.8 | 4.1 | 2.8 | 31 | 3.1 |
| 2 | 102 | 43 | 80 | 52 | 3.2 | 1.4 | 4.7 | 4.1 | 3.8 | 14 | 3.0 |
| 3 | 21 | — | 15 | 14 | 0.7 | — | 3.7 | 4.3 | 7.8 | 17 | 0.5 |
| 4 | 86 | 21 | 67 | 27 | 2.5 | 0.7 | 4.7 | 3.6 | 13.2 | 57 | — |
| 5 | 98 | 39 | 77 | 48 | 3.1 | 1.3 | 5.0 | 3.2 | 5.2 | 18 | — |
| 6 | 98 | 39 | 79 | 48 | 2.9 | 1.2 | 5.2 | 4.1 | 5.8 | 20 | — |
| 7 | 97 | 37 | 76 | 43 | 3.0 | 1.2 | 5.1 | 4.0 | 5.9 | 23 | — |
| 8 | 92 | 33 | 37 | 41 | 2.9 | 1.0 | 5.1 | 3.8 | 5.9 | 31 | — |

TABLE IIB-continued

| Material No. | FLEXURAL STRENGTH MPa Dry | FLEXURAL STRENGTH MPa Cond* | TENSILE STRENGTH MPa Dry | TENSILE STRENGTH MPa Cond* | FLEXURAL MODULUS GPa Dry | FLEXURAL MODULUS GPa Cond* | ELONGATION % Dry | ELONGATION % Cond* | CHARPY NOTCHED IMPACT STRENGTH (KJ/m$^2$) Dry | CHARPY NOTCHED IMPACT STRENGTH (KJ/m$^2$) Cond* | %** Water Absorbtion |
|---|---|---|---|---|---|---|---|---|---|---|---|
| 9  | 93 | 31 | 73 | 41 | 2.9 | 1.0 | 4.9 | 4.4 | 6.2  | 28 | — |
| 10 | 89 | 27 | 70 | 35 | 2.8 | 0.9 | 4.7 | 3.7 | 9.4  | 41 | — |
| 11 | 78 | 21 | 66 | 29 | 2.5 | 0.7 | 4.6 | 3.4 | 9.9  | 52 | — |
| 12 | 75 | 21 | 66 | 28 | 2.5 | 0.7 | 4.8 | 3.4 | 12.7 | 53 | — |
| 13 | 79 | 20 | 65 | 28 | 2.5 | 0.7 | 4.7 | 3.6 | 12.7 | 53 | — |
| 14 | 94 | 24 | 76 | 42 | 2.9 | 0.8 | 4.8 | 2.4 | 6.0  | 39 | 3.1 |
| 15 | 45 | 21 | 38 | 27 | 1.5 | 0.7 | 4.9 | 2.0 | 7.2  | 28 | — |

TABLE IIIA

OVERALL COMPOSITION = A + B

| Material No. | A Percentage Blended Nylon | B Reacted Together % Nylon | B Reacted Together % Paraloid KR725 | % Paraloid in B | MELT FLOW INDEX (MFI) 12.5 kg at 265° C. | MELT FLOW INDEX (MFI) 12.5 kg at 230° C. |
|---|---|---|---|---|---|---|
| 16 | — | Nylon 6, 99 | 1 | 1 | 190 ± 20 | — |
| 17 | — | 95 | 5 | 5 | 5 ± 1 | — |
| 18 | — | 90 | 10 | 10 | 31 ± 10 | — |
| 19 | — | 75 | 25 | 25 | 45 ± 4 | — |
| 20 | — | Nylon 66, 85 | 15 | 15 | 18 ± 2 | — |
| 21 | — | Nylon 11, 85 | 15 | 15 | 43 ± 6 | 18 ± 2 |
| 22 | Nylon 66 70 | Nylon 6, 29.7 | 0.3 | 1 | 23 ± 2 | — |
| 23 | Nylon 66 70 | 28.5 | 1.5 | 5 | 22 ± 4 | — |
| 24 | Nylon 66 70 | 27.0 | 3.0 | 10 | 14 ± 1 | — |
| 25 | Nylon 66 70 | 22.5 | 7.5 | 25 | 1.3 ± 0.3 | — |
| 26 | Nylon 11, 70 | 29.7 | 0.3 | 1 | 130 ± 7 | 30 ± 2 |
| 27 | Nylon 11, 70 | 28.5 | 1.5 | 5 | 190 ± 26 | 69 ± 11 |
| 28 | Nylon 11, 70 | 27.0 | 3.0 | 10 | 106 ± 11 | 62 ± 3 |
| 29 | Nylon 11, 70 | 22.5 | 7.5 | 25 | 190 ± 12 | 87 ± 15 |
| 30 | Nylon 6, 70 | Nylon 66,27.9 | 4.5 | 15 | 53 ± 14 | — |
| 31 | Nylon 6, 70 | Nylon 11,27.9 | 4.5 | 15 | 190 ± 16 | 25 ± 3 |

TABLE III B

| Material No. | FLEXURAL STRENGTH MPa Dry | FLEXURAL STRENGTH MPa Cond* | TENSILE STRENGTH MPa Dry | TENSILE STRENGTH MPa Cond* | FLEXURAL MODULUS GPa Dry | FLEXURAL MODULUS GPa Cond* | ELONGATION % Dry | ELONGATION % Cond* | CHARPY NOTCHED IMPACT STRENGTH (KJ/m$^2$) Dry | CHARPY NOTCHED IMPACT STRENGTH (KJ/m$^2$) Cond* | %** Water Absorbtion |
|---|---|---|---|---|---|---|---|---|---|---|---|
| 16 | 85 | —  | 70 | 33 | 2.8 | —   | 4.8 | 4.6 | 3.9  | 34 | 3.1 |
| 17 | 81 | —  | 58 | 24 | 2.8 | —   | 4.7 | 3.4 | 8.6  | 50 | 2.9 |
| 18 | 73 | —  | 63 | 29 | 2.4 | —   | 4.6 | 3.9 | 11.6 | 50 | 2.8 |
| 19 | 60 | —  | 49 | 22 | 2.0 | —   | 4.8 | 4.2 | 11.1 | —  | 2.3 |
| 20 | 74 | 28 | 55 | 32 | 2.5 | 1.0 | 5.1 | 4.2 | 4.9  | 12 | 2.6 |
| 21 | 27 | 17 | 22 | 18 | 0.9 | 0.6 | 5.0 | 2.4 | 13.7 | 65 | 1.0 |
| 22 | 93 | 32 | 73 | 39 | 2.9 | 1.1 | 4.6 | 3.9 | 5.3  | 19 | — |
| 23 | 93 | 31 | 73 | 39 | 3.0 | 1.1 | 4.8 | 4.0 | 5.1  | 25 | — |
| 24 | 92 | 28 | 71 | 38 | 3.0 | 0.9 | 4.6 | 4.2 | 5.9  | 33 | 3.0 |
| 25 | 82 | 25 | 62 | 32 | 2.8 | 0.9 | 4.7 | 4.3 | 6.2  | 31 | 2.9 |
| 26 | 39 | 23 | 85 | 26 | 1.4 | 0.8 | 4.2 | 4.0 | 2.9  | 12 | 0.9 |
| 27 | 41 | 22 | 34 | 22 | 1.4 | 0.8 | 4.4 | 4.0 | 4.3  | 15 | 0.9 |
| 28 | 39 | 21 | 33 | 20 | 1.4 | 0.8 | 5.1 | 4.1 | 8.2  | 27 | 0.9 |
| 29 | 24 | 14 | 21 | 12 | 0.8 | 0.5 | 3.8 | 3.4 | 12.1 | 32 | 0.9 |
| 30 | 73 | 19 | 63 | 32 | 2.4 | 0.7 | 5.0 | 4.8 | 5.8  | 18 | 3.0 |
| 31 | 58 | 21 | 50 | 31 | 2.0 | 0.7 | 5.4 | 2.1 | 6.5  | 27 | 3.1 |

In materials 4 to 15 the modifier copolymer (B) was a commercially produced sample of the same modifier polymer as used in Example I. (Commercially available as Beetle Nylon AC1 from British Industrial Plastics Limited).

In materials 16 to 31 the modifier copolymer(B) was made on a laboratory scale extruder, this generally giving a higher degree of reaction between the nylon and the acrylic polymer (Paraloid KR725) than in similar materials made commercially.

Mechanical Properties

As shown in the Tables II and III the blending of nylon A and modifier copolymer B generally results in the expected change in mechanical properties for a physical mixture i.e. with increasing content of the acrylic polymer:

(i) decrease in stiffness (modulus)
(ii) decrease in strength (flexural and tensile)
(iii) increase in toughness (impact)

This is evident in the case of adding the modifier copolymer based on nylon 6 and Paraloid KR725 to nylon 6 or 66. Addition of this modifier copolymer to nylon 11 causes an increase in stiffness and strength, however, principally because of the very low values of base nylon 11.

Thus, the following advantages in mechanical properties may be obtained by blending the modifier copolymer based on nylon 6 with nylons:

1. With nylon 66: increased impact strength with marginal reduction in flexural strength and modulus.
2. With nylon 11: increased impact strength and an improvement in mechanical strength and stiffness. (This would be coupled with a lower water absorption than in nylon 6 or 66: therefore nylon 11 modified with a nylon 6/Paraloid adduct could give a novel combination of water absorption, impact, strength and stiffness—see below).

Water Absorption

Water absorption was not included as a specific property to be measured, but some results were obtained in the course of conditioning specimens for mechanical tests. These are also shown in the tables II and III.

The blending of the nylon 11 with the modifier based on Nylon 6 increases the water absorption from about 0.5% to about 0.9%, but this is still only about one third the level for nylon 6 or nylon 66 blends.

Melt Viscosity

Addition of the acrylic polymer Paraloid KR725 to nylons generally increases the melt viscosity (lower MFI), although the change with acrylic content depends upon the system and residual reactivity of constituent B. With nylon 11 the increase in melt viscosity is very marked, even for low levels of the acrylic (Paraloid).

This reduced melt flow index (higher melt viscosity) is a substantial advantage when the melt flow index of the nylon being modified (i.e. Constituent A) is relatively high.

The advantages to be gained from blending the nylon 6/Paraloid modifier copolymer into other nylons are:

(i) increased melt viscosity provided the modifier component B has a lower MFI than the main nylon A enabling somewhat easier processing and the possibility of blow moulding, (ii) expected changes in flexural strength and modulus coupled with an unexpectedly high increase in impact resistance.

Advantage (ii) may be important in two cases:

(a) With nylon 11, where modification with nylon 6/Paraloid leads to a new combination of properties—increased flexural strength and stiffness with much better impact resistance than nylon 11, but with a lower water absorption than nylon 6 or 66.

|  | Nylon 11 | |
|---|---|---|
|  | + 30% | |
|  | Nylon 6: | |
|  | Paraloid | |
| Nylon 11 | 9:1 | Nylon 6 |

| -continued | | | |
|---|---|---|---|
| Flexural Strength MPa (Dry) | 21 | 39 | 87 |
| Flexural Modulus GPa (Dry) | 0.7 | 1.4 | 2.8 |
| Charpy Notched IS kj/m² (Cond) | 17 | 27 | 31 |
| Water Absorption % | 0.5 | 0.9 | 3.1 |

The lower water absorption of this blend should give it a better dimensional stability than that of nylon 6.

(b) with nylon 66, where the modifier increases the impact strength over that of nylon 66 with marginal loss in strength and stiffness. Direct addition of Paraloid KR725 to nylon 66 is possible (material 20) but difficult because of the high melt temperature of nylon 66, and does not result in an increase in impact strength.

We claim:

1. A thermoplastic polymer composition consisting essentially of a mixture of a thermoplastic aliphatic polyamide and, as a modifier, from 0.5 to 50 percent by weight of a copolymer of nylon 6 and an acrylic polymer in which the proportion of the acrylic polymer in the copolymer is not more than 25 percent and in which the acrylic polymer comprises molecular chains derived from acrylonitrile or from a major proportion of an alkyl ester of an acrylic or methacrylic acid and a minor proportion of a copolymerizable unsaturated carboxylic acid, said copolymer being the co-condensate of said nylon 6 and said acrylic polymer, carboxylic acid groups of the acrylic polymer having been reacted with amide groups of the nylon 6 to form carbonamide linkages.

2. A composition according to claim 1 in which the acrylic polymer solely consists of a thermoplastic polymer.

3. A composition according to claim 2 in which the thermoplastic polymer is one in which a major proportion is derived from an alkyl ester or acrylic or methacrylic acid and a minor proportion of a copolymerizable unsaturated carboxylic acid.

4. A composition according to claim 3 in which the acid is an $\alpha\beta$ unsaturated monocarboxylic acid.

5. A composition according to claim 4 in which the acid is acrylic acid or methacrylic acid.

6. A composition according to claims 3, 4 or 5 in which the acid is incorporated in the acrylic polymer in an amount in the range 3% to 15% by weight.

7. A composition according to claim 3, in which the alkyl ester is selected from butyl methacrylate, ethyl methacrylate, butyl acrylate and ethyl acrylate.

8. A composition according to claim 7 in which the alkyl ester is a mixture of esters.

9. A composition according to claim 1 in which the acrylic polymer is a multi-phase polymer comprising a first, elastomeric phase and a second, rigid thermoplastic, phase.

10. A composition according to claim 1 in which the aliphatic thermoplastic polyamide is nylon 66.

11. A composition according to claim 1, 2 or 9 in which the modifier copolymer has a lower melt flow index than the thermoplastic polymer.

12. A composition according to claims 1, 2 or 9 in which the aliphatic thermoplastic polyamide is nylon 6 or nylon 11.

* * * * *